July 26, 1966 A. GLASSMAN 3,263,129

MODULAR TERMINAL BOARD WITH PROVISIONS TO INCORPORATE COMPONENT PARTS AS APPLICABLE

Filed Aug. 19, 1963 2 Sheets-Sheet 1

INVENTOR.
ALEX GLASSMAN

BY Wade Koontz
Lawrence S. Dalton
ATTORNEYS

INVENTOR.
ALEX GLASSMAN
BY Wade Koontz and
Lawrence S. Galka
ATTORNEYS

United States Patent Office 3,263,129
Patented July 26, 1966

3,263,129

MODULAR TERMINAL BOARD WITH PROVISIONS TO INCORPORATE COMPONENT PARTS AS APPLICABLE

Alex Glassman, Denver, Colo., assignor to the United States of America as represented by the Secretary of the Air Force Filed Aug. 19, 1963, Ser. No. 303,192
4 Claims. (Cl. 317—101)

This invention relates generally to an electrical terminal board and particularly to a terminal board with provisions for replacing electrical components mounted thereon.

Clearly, it is of great convenience in many wiring circuits, especially printed circuitry, that certain component parts, such as diodes, special jumpers, critical resistors, etc., be readily removable and replaceable in order to simplify design and adjustment requirements as well as to facilitate maintenance and repair.

Therefore, it is an object of this invention to provide greater versatility and economy in electrical circuitry by a terminal device allowing a ready interchange of component parts.

Another object is to provide a modular terminal board capable of housing component electrical parts in separate modules, each readily removable without disturbance to the others.

It is still another object of the invention to provide a modular terminal board which is economical to produce and which utilizes conventional, currently available materials that lend themselves to standard mass production manufacturing techniques.

Other objects and a fuller understanding of the invention may be had by referring to the following description and claims, taken in conjunction with the accompanying drawings in which:

Figure 1:
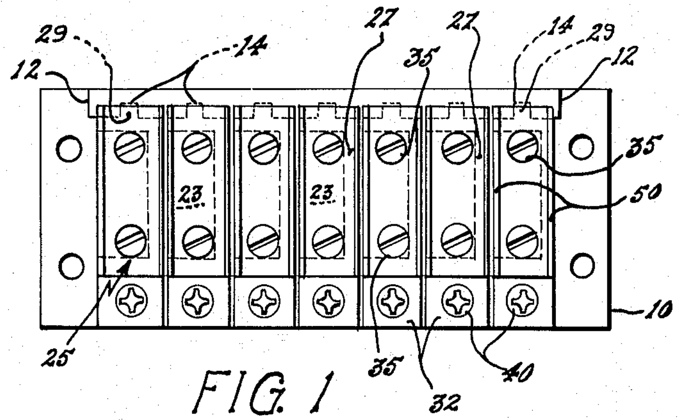
FIG. 1 is a plan view of a terminal board with removable modules mounted thereon.

With reference to the drawings, in which like numerals refer to like parts, a retaining structure is provided by a base plate 10, which has a flat and rectangular shape adaptable for mounting on chassis, circuit boards, or the like. As clearly indicated in FIG. 3, a trackway along the length of base 10 may be constructed by channeling the back edge to form a track 12 integral therewith. Track 12 has a series of notches 14, visible in FIG. 1, which are equally spaced along its length. The alternate embodiment of FIG. 4 employs a thicker base plate 10 rabbeted lengthwise with a dovetail groove 15 to provide a trackway therealong.

Figure 2:
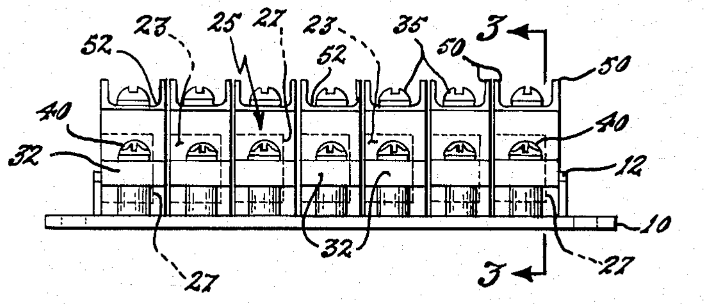
FIG. 2 is a front elevation of the terminal board and modules shown in FIG. 1.
Figure 3:
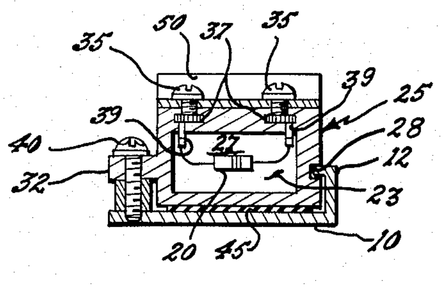
FIG. 3 is a cross-sectional view taken along the line 3—3 of FIG. 2.

A typical component part 20 is housed within an internal cavity 23 in each of the hollow modules 25, which are formed of a rigid insulating material, preferably, by molding one of the many available phenolic and epoxy resins. As shown in the figures, the modules 25, each open at one side only to a cavity 23 and have a closed side 27 opposite to the opening. The size and shape of modules 25 and each cavity 23 should, of course, be suited to the configuration of the component part 20. The modules 25 are conformed at an edge, as illustrated, to match the trackway in base 10. In FIGS. 1, 2, and 3, the modules 25 have a groove 28 at a rear external edge which is in matching engagement with the channeled track 12. Module projections at 29 through groove 28 fit within the notches 14 and aid in the alignment and mounting of the modules 25. An alternate conformation is accomplished in FIG. 4 by matching the dovetailed groove 15 with a correspondingly shaped projection at 30. Each of the modules 25 includes a front tab at 32, as illustrated.

External terminals 35 may be provided by a suitable binderhead screw, or stud and binder nut, extending from an insert 37, molded into each module. Lugs 39 extend from the inserts into the cavity 23, as shown, for a suitable connection with a component part 20.

A removable fastener for locking each module on base 10 may be provided by a machine screw 40. A neoprene strip 45 may be cemented on base 10, as shown, to provide a vibration absorbing cushion between the base 10 and modules 25.

A terminal insulator to isolate terminals 35 on each of the modules from those of adjoining modules may be accomplished by protective flanges 50, which, as illustrated in the figures, extend outward from each side of each module. As demonstrated by FIG. 2, suitable flanges 50 may be provided by a channel length 52 of nylon or formed fiber board, or as in FIG. 4 by separator plates between each of the modules 25. Terminals 35 of the same module may be isolated from each other by sufficient separation, or as shown in FIG. 4, by facing each terminal 35 in a different direction.

The cup-like configuration of the modules 25 facilitates potting if so desired. A conventional potting material (not shown) may be easily placed in cavity 23 to enclose the component part 20 therein. Furthermore, it may be highly desirous to provide an external mark on each of modules 25 to identify the component part 20 within, particularly for potted modules. Conventional symbols and color coding (not shown on the drawings) may be utilized, for example, on each module 25, on the insulator channel 52, or by a special flag under the fastening screws 40.

Figure 4:
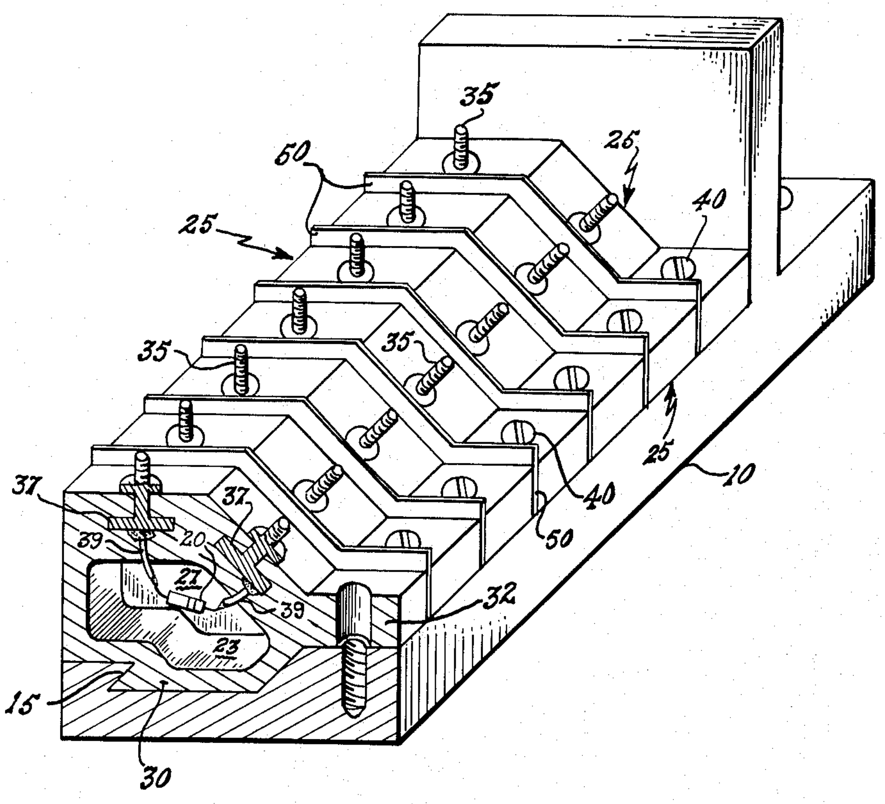
FIG. 4 is an isometric view showing an alternate embodiment of the invention.

A plurality of modules 25, each housing a key component part 20 of an electrical circuit, are aligned together along the trackway of base 10 by engagement of track 12 within grooves 28, or as in FIG. 4 by engagement of projection 30 within dovetail groove 15. As illustrated, the modules are contiguous, side by side, with each having an open cavity 23 enclosed by the closed side 27 of an adjoining module, and in this fashion each cavity 23 is insulated from another. An individual fastener screw 40 through the front tab 32 firmly affixes each module in place on the base 10. At FIG. 1, the projections 29 enter notches 14 of the channel track 12 to aid in aligning and locking of the modules in place. Electrical circuit leads (not shown) may be connected to each component part 20 at their respective terminals 35. The removal of an individual module 25 and the desired component part 20 within is easily accomplished. Component part 20 is disconnected from the circuit by removing leads to the terminals 35. Removal of a single fastening screw 40 then enables the module to be removed without disturbance to the remaining modules. A module housing a new component part 20 may then be substituted, and in this manner a convenient replacement and interchange of component parts may be accomplished.

Although the invention has been described with reference to particular embodiments, it will be understood to those skilled in the art that the invention is capable of a variety of alternative embodiments within the spirit and scope of the appended claims.

I claim:

1. A modular electrical terminal board for housing component parts, comprising: a retaining structure including a base with a mounting trackway therealong; a plurality of contiguous modules, each having an open side with an internal cavity housing a component part therein and also a closed side opposite thereto, said modules each conformed at an edge to match said trackway for alignment therealong, respectively, open side by closed side with each cavity insulated from another by a closed side of said modules; an external terminal on each of said modules, said terminal having means including an insert extending into said cavity for connection with said component part; means to isolate said external terminal from another of an adjoining module; a tab at each of said modules opposite said conformed edge, and removable fastener means in engagement with said tab and said base for affixing each module on said structure.

2. A modular electrical terminal board for housing component parts comprising a generally flat, rectangular base, a channeled trackway extending along one long edge thereof, a series of notches in said trackway, a plurality of modules arranged along said trackway, said modules being formed with an opening at one side defining an internal cavity for housing a component part, a groove at the rear side of each of said modules and a projection interrupting said groove, the dimensions of said grooves and projections being such that said trackway conforms to said grooves and said projections to said notches in order to position said module longitudinally along said trackway, a tab extending from the forward end of said module, and securing means for clamping said module to said base through said tab.

3. A modular electrical terminal board as defined in claim 2 wherein said trackway and grooves comprise dovetail mating portions.

4. A modular electrical terminal board as defined in claim 2 including a sheet of resilient material between said module and said base.

References Cited by the Examiner

UNITED STATES PATENTS

| | | | |
|---|---|---|---|
| 2,916,721 | 12/1959 | Adams | 317—101 X |
| 3,085,140 | 4/1963 | Roe | 200—168 |
| 3,123,425 | 3/1964 | Blanchet | 339—198 |
| 3,188,523 | 6/1965 | Yungkurth | 317—101 |

FOREIGN PATENTS

| | | |
|---|---|---|
| 851,082 | 10/1952 | Germany. |
| 566,759 | 1/1945 | Great Britain. |

ROBERT K. SCHAEFER, *Primary Examiner.*

KATHLEEN H. CLAFFY, *Examiner.*

M. GINSBURG, *Assistant Examiner.*